US010913127B2

(12) United States Patent
Raudsepp et al.

(10) Patent No.: US 10,913,127 B2
(45) Date of Patent: Feb. 9, 2021

(54) METHOD FOR STARTING A SUBMERGED ARC WELDING PROCESS AND WELDING APPARATUS

(71) Applicant: ESAB AB, Gothenburg (SE)

(72) Inventors: Hannes Raudsepp, Solna (SE); Martin Andersson, Mariestad (SE); Tomas Johansson, Laxa (SE); Rikard Ljungkvist, Kumla (SE)

(73) Assignee: ESAB AB, Gothenburg (SE)

( * ) Notice: Subject to any disclaimer, the term of this patent is extended or adjusted under 35 U.S.C. 154(b) by 1247 days.

(21) Appl. No.: 14/440,091

(22) PCT Filed: Nov. 2, 2012

(86) PCT No.: PCT/EP2012/071685
§ 371 (c)(1),
(2) Date: May 1, 2015

(87) PCT Pub. No.: WO2014/067580
PCT Pub. Date: May 8, 2014

(65) Prior Publication Data
US 2015/0273614 A1    Oct. 1, 2015

(51) Int. Cl.
*B23K 9/18* (2006.01)
*B23K 9/067* (2006.01)
*B23K 9/073* (2006.01)

(52) U.S. Cl.
CPC .............. *B23K 9/188* (2013.01); *B23K 9/067* (2013.01); *B23K 9/073* (2013.01); *B23K 9/0732* (2013.01); *B23K 9/186* (2013.01)

(58) Field of Classification Search
CPC ...... B23K 9/0671; B23K 9/067; B23K 9/073; B23K 9/0732; B23K 9/18; B23K 9/186; B23K 9/188
(Continued)

(56) References Cited

U.S. PATENT DOCUMENTS 3,868,491 A * 2/1975 Ito ...................... B23K 35/3053
148/24
4,246,463 A * 1/1981 Shutt ...................... B23K 9/188
219/122
(Continued)

FOREIGN PATENT DOCUMENTS

CA        2812524 A1    4/2012
CN     101058125 A    10/2007
(Continued)

OTHER PUBLICATIONS

Dilthey U, et al, "Verbesserung der Heissrisssicherheit beim Schweissen von Nickel-Basislegierungen durch UP-Kaldrahtschweissverfahren," Schweissen Und Schneiden, DVS Verlag, Dusseldorf, DE, 60, 2, Feb. 1, 2008, 88-96.

*Primary Examiner* — Thien S Tran
(74) *Attorney, Agent, or Firm* — Edell, Shapiro & Finnan, LLC

(57) ABSTRACT

A method comprising an arc ignition phase (IP), an arc-stabilizing phase (AP) and a stable arc phase (SP). The arc stabilizing phase comprises an initial sub-phase (IS) comprising the step of feeding at least one hot wire (4, 12) at constant feed speed and a main sub-phase (MS) comprising the steps of feeding said hot wire at constant feed speed and feeding at least one cold wire (22) at constant feed speed. The stable arc phase comprises the steps of continuously adjusting the feed speed of the hot wire and continuously adjusting the feed speed of the cold wire. The invention also relates to a welding apparatus (1) for carrying out the method. The welding apparatus comprises a hot wire feeding means (150), a contact means (2), a cold wire feeding means (35) and a control unit (31). The control unit is adapted to control said hot wire feeding means to feed the hot wire at a constant feed speed during the initial sub-phase, feed the hot wire at a constant feed speed during the main sub-phase
(Continued)

and to continuously during the stable arc phase adjust the feed speed of the hot wire. The control unit is adapted to control said cold wire feeding means to feed the cold wire at a constant feed speed during the main sub-phase and continuously during the stable arc phase adjust the cold wire feed speed.

9 Claims, 7 Drawing Sheets

(58) Field of Classification Search
USPC ................ 219/73, 73.1, 130.01, 137.71
See application file for complete search history.

(56) References Cited

U.S. PATENT DOCUMENTS

| | | | | |
|---|---|---|---|---|
| 5,528,010 | A * | 6/1996 | Herwig | B23K 9/0734 |
| | | | | 219/121.47 |
| 6,683,271 | B2 * | 1/2004 | Rogers | B05B 7/224 |
| | | | | 219/137.71 |
| 8,080,763 | B2 * | 12/2011 | Fujiwara | B23K 9/0735 |
| | | | | 219/130.51 |
| 2003/0062355 | A1 * | 4/2003 | Ikegami | B23K 9/0017 |
| | | | | 219/137 PS |
| 2006/0163230 | A1 * | 7/2006 | Kaufman | B23K 9/1336 |
| | | | | 219/137.71 |
| 2007/0145028 | A1 * | 6/2007 | Artelsmair | B23K 9/1675 |
| | | | | 219/137.71 |
| 2007/0158324 | A1 * | 7/2007 | O'Donnell | B23K 9/1068 |
| | | | | 219/137.71 |

FOREIGN PATENT DOCUMENTS

| | | |
|---|---|---|
| CN | 101058126 A | 10/2007 |
| DE | 10249079 A1 | 5/2004 |
| GB | 1016896 A | 1/1966 |
| GB | 1016896 * | 12/1966 |
| JP | H09-271944 A | 10/1997 |
| WO | 2010/112068 A1 | 10/2010 |
| WO | 2012/041375 A1 | 4/2012 |
| WO | 2014/026698 A1 | 2/2014 |

* cited by examiner

METHOD FOR STARTING A SUBMERGED ARC WELDING PROCESS AND WELDING APPARATUS

TECHNICAL FIELD

The invention relates to a method for starting a submerged arc welding process. The method comprises an arc ignition phase, an arc-stabilizing phase and a stable arc phase.

The invention also relates to a welding apparatus for carrying out the method according to the invention. The welding apparatus comprises hot wire feeding means for feeding at least one hot wire towards a work piece, contact means for transferring current to said hot wire for arc generation, a cold wire feeding means for feeding at least one cold wire towards the work piece, and a control unit adapted to control said hot and cold wire feeding means during an arc ignition phase, an arc-stabilizing phase and a stable arc phase.

BACKGROUND OF THE INVENTION

It is known to use a consumable electrode to conduct a weld current through a work piece. The weld current forms an arc between the consumable electrode and the work piece to create a weld pool on the work piece. A consumable electrode of this type is throughout this specification referred to as a hot wire.

Submerged arc welding (SAW) is a welding method characterized by high productivity and quality, often used for longer welding seems in thicker materials. Submerged arc welding is characterized in that the melted material and the arcs are protected beneath a layer of pulverized flux. The flux melts in part during the process, thus creating a protecting layer of slag on the weld pool.

To achieve the highest productivity possible with submerged arc welding, one strives for increased weld speed and the highest possible deposition rate, i.e. the rate at which weld metal is deposited onto the work piece surface. At the same time, the heat input should be kept on a level that preserves the mechanical properties of the welded parent material and the weld should have mechanical properties of a certain level.

One way to increase the deposition rate is to use a plurality of hot wires to create a single weld puddle. Usually 2-3 hot wires are used, however, usage of up to 6 hot wires is known. Using more than one hot wire in a single weld puddle increases the deposition rate and therefore improves the economy of welding. It also enables improved weld quality due to the possibility of assigning leading and trailing hot wires with different tasks.

Another way to improve the deposition rate is to add one or more electrodes that melt without formation of arcs. These electrodes are throughout this specification referred to as cold wires. A cold wire is fed towards a molten weld pool in close proximity to one or more hot wires. The cold wire is melted by resistance heating as well as by the heat generated by the hot wires.

The introduction of cold wire material into the weld puddle may lead to improved control of the composition of the weld alloy, which may lead to improved welds. It is preferable to introduce the cold wire in the vicinity of and preferably into an arc generated by a hot wire (even more preferably in the vicinity of or into arcs generated by a plurality of hot wires). A cold wire increases the deposition rate without increasing the heat input. Feeding cold wire material into the weld puddle may lead to an increase of productivity of up to 100% with optimized welding parameters.

It is desirable to produce a stable arc as quickly as possible at the beginning of a welding process. The presence of unstable arcs at the beginning of the welding process may cause weld defects such as inclusions, splatter, and poor mechanical properties in the welded object. The presence of unstable arcs may also lead to a reduced melting rate and, as a consequence thereof, the hot wire may hit the bottom of the weld puddle.

Likely consequences are bending of the hot wire and displacement of the welding head. An unstable welding start may also cause arcs to protrude out of the flux cover, which can damage the eyes of the welder.

Unstable arcs are a common problem when cold wires are used in the welding process, as cold wires tend to increase the welding process instability. Insufficient melting of a cold wire may cause it to strike the parent material through the melt pool. This may cause weld defects and inclusions in the weld metal of unmelted cold wire material as well as buckling of the cold wire and swaying of the welding equipment.

Delayed establishment of a stable arc is a particularly common problem in welding processes involving a plurality of hot wires, wherein many arcs strike at the same time. This is particularly the case in twin setups, wherein two hot wires are connected to a common power source. Moreover, the inclusion of a cold wire between two hot wires increases the distance between said hot wires, which makes it even more difficult for the hot wires to produce stable arcs.

US 2006/0016792 A1 addresses the issue of stable arc generation. A welding wire is delivered to a weld area at a run-in speed. After detection of an initial arc the wire feed speed is adjusted to a minimum value for a predetermined period of time (e.g. approximately 50 ms). Thereafter, the wire feed speed is set to a relatively stable feed speed for welding.

The solution proposed in US 2006/0016792 A1 is complex, does not solve the problem of the destabilizing effect of the cold wires and does not relate to SAW.

A first object of the invention is to provide a method for starting a submerged arc welding process including one or more cold wires, which method ensures high weld quality already at the beginning of the welding process.

A second object of the invention is to provide a welding apparatus for carrying out said method.

BRIEF DESCRIPTION OF THE INVENTION

A phase preceding another phase does not have to be immediately preceding that phase. Other phases may be executed between said phases. A phase subsequent to or following another phase does not have to be immediately following that phase. Other phases may be executed between said phases. A phase may comprise any number of sub-phases.

Throughout this specification, references are made to welding parameters. A welding parameter is a parameter that has a direct influence on the welding process. Examples of welding parameters are welding current, arc voltage, welding speed, hot wire feed speed and cold wire feed speed.

Welding parameters related to or dependent on one another are welding parameters that, directly or indirectly, influence one another. A welding parameter determined in dependence on another welding parameter can be determined from a measured value of said other welding parameter or from a measured value of a welding parameter related to said other welding parameter.

An active welding parameter is a welding parameter that is manually or automatically adjusted during welding in response to changes in welding conditions. Active welding parameters can be adjusted, directly or indirectly through adjustment of other active welding parameters, to maintain one or more non-active welding parameters at an essentially constant level.

Welding conditions are factors that influence the welding process. Examples of welding conditions are the shape and material properties of the work piece.

The first object of the invention is achieved with a method as defined in independent claim 1.

The method for starting a submerged arc welding process according to the invention comprises, in the following order, an arc ignition phase, comprising the step of producing an arc, an arc-stabilizing phase and a subsequent stable arc phase. The arc-stabilizing phase comprises at least one initial sub-phase and a least one main sub-phase. The initial sub-phase comprises the step of feeding at least one hot wire towards a work piece at a constant feed speed. The main sub-phase comprises the steps of feeding said hot wire towards said work piece at a constant feed speed and feeding at least one cold wire towards said work piece at a constant feed speed. The stable arc phase comprises the steps of continuously adjusting the feed speed of the hot wire in dependence on at least a welding current transferred through said hot wire and continuously adjusting the feed speed of the cold wire in dependence on at least one hot wire feed speed of the stable arc phase.

An arc is ignited during the arc ignition phase. The ignition phase ends and the arc-stabilizing phase begins upon detection of said arc. The arc is stabilized during the arc-stabilizing phase. The arc-stabilizing phase may have a predetermined length or may be automatically terminated when a stable arc has been detected. The arc-stabilizing phase may also be manually terminated when a user of a welding apparatus detects a stable arc or when the welding apparatus informs said user that a stable arc has been detected. The end of the arc-stabilizing phase marks the beginning of the stable arc phase. A stable arc is now present between the hot wire and the work piece and welding can be carried out with optimal results.

A welding start can also be divided into an arc ignition phase (identical to the ignition phase preceding the arc-stabilizing phase) and a welding phase, in some embodiments separated by one or more start-up phases. Welding on the work piece is carried out mainly during the welding phase. In embodiments wherein the welding phase follows immediately after the ignition phase, the arc-stabilizing phase and the welding phase begins simultaneously. That is, welding is carried out almost from the beginning of the welding process, even before a stable arc has been generated. In embodiments wherein the ignition phase and the welding phase are separated by one or more start-up phases, the arc-stabilizing phase begins simultaneously with the first start-up phase.

The start-up phases are included to increase the likelihood of a stable arc being present when the welding phase begins (welding during the start-up phases may be carried out on a run on/run off plate). In these embodiments, the arc-stabilizing phase may end before, simultaneously with or after the beginning of the welding phase. Each sub-phase of the arc-stabilizing phase, with the possible exception of the last sub-phase, begins and ends simultaneously with a corresponding start-up phase. The arc-stabilizing phase may have the same length as the combined length of the start-up phases, in which case the number of sub-phases is equal to the number of start-up phases. However, the arc-stabilizing phase may also extend into the subsequent welding phase, in which case there may be an additional, final sub-phase covering the period between the end of the last start-up phase and the beginning of the welding phase. It is also possible to extend the last main sub-phase to the beginning of the welding phase. The arc-stabilizing phase may also end before the end of the last start-up phase, in which case the last main sub-phase ends before the end of the last start-up phase.

The welding process carried out during the stable arc phase is a constant amperage (CA) welding process. A CA welding process is a process wherein an arc voltage level remains constant and the amperage level of the welding current transferred through the hot wire is maintained at a given level through adjustment of the hot wire feed speed. The amperage level is related to the distance between the hot wire end and the work piece. A hot wire feed speed increase will result in a welding current increase and a hot wire feed speed reduction will result in a welding current reduction. Disturbances, such as stick out variations caused by work piece surface irregularities, variations in the welding process or joint configurations, sometimes change the distance between the hot wire end and the work piece and, as a consequence thereof, the amperage level. However, the amperage level can be maintained at a set level, i.e. the amperage level is restored to its previous value following a change of the amperage level, through automatic adjustment of the hot wire feed speed. The CA welding process has several advantages. For example, the maintenance of a given amperage level ensures that heat input and penetration remains essentially constant throughout the welding process.

It has been discovered that a self-regulating CA welding process is unsuitable for use during the arc-stabilizing phase. Sudden current variations are common during the arc-stabilizing phase and corresponding adjustments of the hot wire feed speed, executed automatically in response to said variations, are slow in comparison and may have a negative impact on the arc stabilization process.

The solution to this problem is to feed the hot wire at constant feed speed (CW) during at least one initial sub-phase and one main sub-phase of the arc-stabilizing phase, and to feed the cold wire at constant feed speed (CW) at least during one main sub-phase of the arc-stabilizing phase. That is, the self-regulating CA welding process is made inactive during the arc-stabilizing phase. This solution solves the above mentioned problem of the self-regulating CA process having a negative impact on the arc stabilization process. The CW welding process ensures rapid generation of a stable arc. The self-regulation CA welding process is activated when the arc-stabilization process enters the stable arc phase. This solution is compatible with a CA welding apparatus, wherein the self-regulating wire feed speed control is turned off during the arc-stabilizing phase.

As mentioned above, the presence of one or more cold wires in the vicinity of the hot wire makes it even more difficult to generate a stable arc between the hot wire and the work piece.

One solution to this problem is to feed the cold wire at constant feed (CW) speed during at least one sub-phase of arc-stabilizing phase. A constant cold wire feed speed has a less negative impact on the arc-stabilization process.

Another solution, compatible with the above described solution, is to ensure that the negative impact of the cold wire is minimized or eliminated during at least the beginning of the arc-stabilizing phase. This is achieved by ensuring that the cold wire does not reach the weld puddle during at least one initial sub-phase of the arc-stabilizing phase, or at least does not reach the weld puddle at a feed speed at which the cold wire may have a (significant) negative impact on the arc-stabilizing process. Preferably, the cold wire feed speed in a direction towards the work piece remains equal to or below 9 cm/min during said initial sub-phase. More preferably, the cold wire remains stationary (not fed forward) during said initial sub-phase.

Thus, the method according to the invention ensures a quick generation of a stable arc, and consequently a good weld quality from the beginning of the welding process, also when the welding apparatus is arranged to feed one or more cold wires towards the work piece.

Advantageously, the feed speed of a cold wire is determined in dependence on at least one corresponding hot wire feed speed, i.e. the cold wire feed speed of a sub-phase is determined in dependence on at least one hot wire feed speed of said sub-phase, to ensure that the cold wire assumes a feed speed suitable for the current melting rate. Additional welding parameters may be used to determine suitable cold wire feed speeds.

The feed speed of the hot wire, as well as the feed speed of the cold wire may vary from one sub-phase to another, as long as they remain constant throughout said sub-phases.

"Stable arc phase welding current" is a recurring term. The stable arc phase welding current is defined as the welding current to be maintained during the part of the stable arc phase coinciding with the welding phase. Said part of the stable arc phase may constitute the entire stable arc phase.

Another recurring term is "expected stable arc phase feed speed of the hot wire". The expected stable arc phase feed speed of the hot wire, or the expected stable arc phase hot wire feed speed, is defined as the hot wire feed speed corresponding to the stable arc phase welding current, that is, the feed speed required to maintain the stable arc phase welding current at its set level under a predetermined set of welding conditions. Note that the actual hot wire feed speed may vary during the stable arc phase whereas the expected stable arc phase hot wire feed speed is a predetermined value used only to determine wire feed speeds suitable for the arc-stabilizing phase.

In some embodiments, it is desirable to initiate the welding phase as early as possible, and most preferably immediately following the arc ignition phase, simultaneously with the arc-stabilizing phase. In this embodiment, advantageously, the feed speed of the hot wire remains constant throughout the arc-stabilizing phase, and even more advantageously at a level in the range 80-95% of the expected stable arc phase feed speed of the hot wire. This solution ensures that the weld produced during the arc-stabilizing phase is of high quality and that the transition from the arc-stabilizing phase to the stable arc phase is executed as quickly and smoothly as possible (a large increase or reduction of the hot wire feed speed at the end of the arc-stabilization phase may cause the arc to become unstable).

In other embodiments, it may be advantageous to delay the start of the welding phase by executing one or more, usually two, start-up phases between the ignition phase and the welding phase. The start-up phases are introduced to ensure that a stable arc is present at the beginning of the welding phase. Each sub-phase, with the possible exception of the last sub-phase, begins and ends simultaneously with a corresponding start-up phase.

The feed speed of the hot wire may vary between at least two different sub-phases. For example, the hot wire feed speed may be increased every time the arc-stabilization process enters a new sub-phase. This is advantageous in that it is usually easier to establish a stable arc at a low hot wire feed speed, and in that it is desirable to apply a hot wire feed speed during the last sub-phase close to the expected hot wire feed speed of the stable arc phase, to ensure a smooth transition from the arc-stabilizing phase to the stable arc phase. However, there are embodiments wherein the expected hot wire feed speed of the stable arc phase is too low to be suitable for generation of a stable arc. In these embodiments, advantageously, the hot wire feed speed is gradually decreased during the arc-stabilizing phase, from a high initial feed speed value during the initial sub-phase appropriate for stable arc generation to a lower feed speed during the last sub-phase.

Of course, the hot wire feed speed does not have to gradually increase or decrease during the arc-stabilizing phase. The hot wire may also be fed forward at the same constant feed speed during two or more sub-phases and at a different constant feed speed during an additional sub-phase.

Advantageously, the cold wire feed speed is significantly lower than the corresponding hot wire feed speed during the initial start-up phase, to facilitate generation of a stable arc early in the arc-stabilization process. More advantageously, the cold wire remains stationary during the initial start-up phase. Thereafter, the cold wire feed speed may be determined in dependence on at least the feed speed of at least one hot wire, i.e. the cold wire feed speed is increased as the hot wire feed speed is increased and reduced when the hot wire feed speed is reduced.

Note that the arc-stabilizing phase may comprise any number of initial and main sub-phases.

Suitable feed speed values for the hot wire during the arc-stabilizing phase can be determined in a plurality of ways. In one embodiment, without start-up phases, the user enters a welding current to be maintained during the stable arc phase. This welding current is referred to as the stable arc phase welding current. The control unit uses this information, and possibly other given welding parameters (e.g. arc voltage and wire travel speed), and a predetermined table of values to determine a hot wire feed speed to be applied during the arc-stabilizing phase. This hot wire feed speed is, advantageously, in the range 80-95% of the expected stable arc phase hot wire feed speed corresponding to said stable arc phase welding current.

Other embodiments may comprise start-up phases, wherein each start-up phase corresponds to a sub-phase of the arc-stabilizing phase. Herein, the user may enter one or more welding parameter values related to a specific start-up phase as wells as a stable arc phase welding current level to be maintained during the stable arc phase, and possibly other welding parameter values, and the control unit uses this information and a predetermined table of values to determine suitable hot wire feed speeds for said start-up phases. Each start-up phase corresponds to a sub-phase, so the suitable hot wire feed speed for a start-up phase is also the suitable hot wire feed speed for the corresponding sub-phase. Examples of suitable welding parameters are welding current, arc voltage and travel speed of the hot and cold wires (note that most CA welding apparatuses do not allow the user to enter hot wire feed speeds).

The arc-stabilizing phase may in some embodiments end after the end of the last start-up phase. The suitable hot wire feed speed for the period between the end of the last start-up phase and the beginning of the welding arc-phase, also called the final sub-phase, is determined as described above with reference to an embodiment without start-up phases.

The arc-stabilizing phase may also end before the end of the last start-up phase. The suitable hot wire feed speed for the period between the end of the arc-stabilizing phase and the end of the last start-up phase may be determined by the control unit using the stable arc phase welding current, a predetermined table of values, welding parameters specific for the last start-up phase and possibly other welding parameters entered by the user.

The skilled person realizes that there are many alternative ways to determine suitable hot and cold wire feed speeds for the arc-stabilizing phase and that the scope of protection provided by the claims covers said alternative ways.

Advantageously, the feed speed of a hot wire during a sub-phase is in the range 0-200% of the expected stable arc phase feed speed of said hot wire, and the constant feed speed of a cold wire during said sub-phase is in the range 0-100% of the feed speed of said hot wire during said sub-phase.

As mentioned above, there are circumstances under which the hot wire may assume a feed speed during the arc-stabilizing phase higher than the expected stable arc phase feed speed of said hot wire. It is also possible for the cold wire to assume a feed speed higher than a corresponding hot wire feed speed during the arc-stabilizing phase.

However, it is usually advantageous for the hot wire to assume a feed speed during a sub-phase in the range 0-100% of the expected stable arc phase hot wire feed speed. It has been discovered that long arcs are more easily stabilized. One way to increase the length of the arcs is to reduce the hot wire feed speed. Consequently, the feed speed of the hot wire is advantageously set at a value lower than the expected stable arc phase feed speed of said hot wire. A low feed speed also has the beneficial effect of reducing the risk of the hot wire being burned off, which can happen when an arc is ignited and a high current is transferred through the hot wire. The risk of this happening during the arc-stabilizing phase is reduced if the welding current is set to a relatively low value. Yet another reason for applying a low feed speed to the hot wire is to reduce the risk of the hot wire hitting the bottom of the weld puddle. An inconsistent welding start may lead to a reduced melting rate and a reduction of the distance between the hot wire end and the work piece. In a worst case scenario, the hot wire may come into contact with the work piece. The reduced feed speed of the hot wire reduces the risk of this happening.

It is advantageous if the hot wire during the last sub-phase assumes a feed speed in the range 80-95% of the expected stable arc phase feed speed of the hot wire, to facilitate a smooth transition from the arc-stabilizing phase to the stable arc phase and possibly also to ensure a good weld quality during the last sub-phase. A hot wire feed speed in this range also ensures that the welding current will be sufficiently high at the beginning of the stable arc phase to produce a good weld.

Advantageously, the constant feed speed of the cold wire during a sub-phase is in the range 0-200%, and more advantageously 0-100%, of the constant feed speed of a hot wire during said sub-phase. Advantageously, at least during the last sub-phase, the cold wire feed speed is in the range 70-90% of the constant feed speed of said hot wire. However, the cold wire may adapt a lower feed speed, for example in the range 10-60% of a corresponding hot wire feed speed, during earlier sub-phases. Of course, the cold wire feed speed is advantageously below 9 cm/min and even more preferable 0 cm/min at least during the first sub-phase.

The melting rate of the cold wire will remain low as long as there is no stable arc present in the vicinity of the cold wire. Therefore, it is advantageous if the feed speed of the cold wire is set lower than what would have been appropriate in the presence of a stable arc, to ensure that the cold wire does not hit the bottom of the weld puddle. However, as with the hot wire, it is advantageous if the adjustment of the cold wire feed speed when the arc-stabilization process enters the stable arc phase is relatively small, especially considering that the cold wire feed speed usually is not increased as quickly as the hot wire feed speed.

Advantageously, the arc-stabilizing phase has a predetermined length. This eliminates the need for stable arc detection means and the welding apparatus becomes simpler and less expensive. Advantageously, the arc-stabilizing phase has a predetermined length in the range 1-6 seconds and preferably in the range 1-3 seconds.

Advantageously, when the hot wire feed speed remains constant throughout the arc-stabilizing phase, the cold wire feed speed remains equal to or below 9 cm/min during a first portion of the arc-stabilizing phase, which first portion preferably has a predetermined length in the range 0.5-5 seconds and more preferable in the range 2-3 seconds. That is, advantageously, the length of the initial sub-phase (or the combined length of a plurality of initial sub-phases) is in the range 0.5-5 seconds and more preferably in the range 2-3 seconds.

When the hot wire feed speed does not remain constant throughout the arc-stabilizing phase, when it changes from one sub-phase to another, then the length of the initial sub-phase or the combined length of a plurality of initial sub-phases is, preferably, in the range 0.5-5 seconds and more preferably in the range 1.5-2.5 seconds.

The invention is not limited to the above defined ranges. For example, the length of the arc-stabilizing phase may be as short as 0.1 seconds, in which case the length of the initial sub-phase(s) is adjusted accordingly. The length of the arc-stabilizing phase may also be longer than 6 seconds. The length of the initial sub-phase(s) may be both shorter than 0.5 seconds and longer than 5 seconds.

Advantageously, when one or more start-up phases are included in the welding process, the length of the initial sub-phase (or the combined length of a plurality of initial sub-phases) is shorter than the length of the main sub-phase (or the combined length of a plurality of main sub-phases).

It is possible to provide the welding apparatus with some sort of arc detection means, which detects the presence of a stable arc and sends information indicating the presence of a stable arc to a control unit that executes the switch from CW to CA. This solution ensures that the arc-stabilizing phase remains as short as possible and at the same time ensures that the switch to CA is not executed too early, before a stable arc has been produced.

The method advantageously comprises the step of feeding at least one additional hot wire towards the work piece while transferring welding current to said additional hot wire for arc generation. Advantageously, the feed speed of an additional hot wire is regulated as described above.

Advantageously, the method comprises the step of igniting an arc between the at least one additional hot wire and the work piece. Advantageously, the initial and main sub-phases all comprise the step of feeding said at least one additional hot wire towards the work piece at constant feed speed, wherein the constant feed speed of one sub-phase may be the same or different from the constant feed speed of another sub-phase. Advantageously, the stable arc phase comprises the step of continuously adjusting the feed speed of said at least one additional hot wire in dependence on at least a welding current transferred through said hot wire.

Incorporating one or more additional hot wires into the welding process is a means to increase the deposition rate. With this arrangement, it also becomes possible to assign different task to the hot wires. However, arranging a plurality of hot wires in the vicinity of a cold wire may also result in a plurality of sparks striking at the same time during the arc-stabilizing phase. This problem is particularly common in twin setups where two wires are connected to one power source. The presence of a plurality of sparks makes it difficult for the arcs to stabilize and if no stable arcs are in place to melt the cold wire, the cold wire may hit the plate and buckle, causing the welding equipment to sway. Thus, it becomes even more important to ensure the generation of a stable arc when the welding process includes one or more hot wires. This is achieved with the method and welding apparatus according to the invention.

Advantageously, the feed speed of the cold wire during the arc-stabilizing phase is dependent on the feed speed of a single hot wire. This allows for a simple and less expensive solution. However, it is also possible to determine the feed speed of the cold wire in dependence on the feed speed of more than one hot wire, e.g. a mean value of a plurality of hot wire feed speeds.

During the stable arc phase, the feed speed of the cold wire can be determined in dependence on the feed speed(s) of one or more hot wires. For example, in an arrangement where two or more hot wires are located at a distance from one another along an axis extending in the welding direction (the direction of movement of the welding apparatus) and the hot wires are assigned different tasks, wherein the leading hot wire (located first as seen in the direction of welding) is used to control the degree of penetration and the trailing hot wires (located behind the leading hot wire as seen in the direction of welding) are used to control bead appearance, contour and fill, the feed speed of the cold wire is advantageously related to the feed speed of one or more of the trailing hot wires (e.g. a mean value of a plurality of trailing hot wire feed speeds). In an alternative embodiment, the feed speed of the cold wire may be related to the feed speed of the leading hot wire or a mean value of the feed speeds of leading and trailing hot wires. Additional ways of arranging and relating the feed speed of one or more cold wires to one or more hot wires are possible. For example, in twin welding, wherein two or more hot wires are connected to the same power source, the hot wires are usually considered as a single hot wire and the feed speed of the cold wire may be related to the feed speed of a single hot wire.

Other suitable methods for continuous adjustment of hot and cold wire feed speeds during the stable arc phase are described in PCT/EP2012/003461, the content of which is hereby incorporated by reference.

The feed speed of the cold wire can also be related to additional welding parameters, e.g. arc voltage and welding head travelling speed.

Note that the feed speed of the cold wire can be indirectly related to one or more hot wire feed speeds. This is the case when the feed speed of the cold wire is related to an active welding parameter which in turn is related, directly or indirectly, to the feed speed of said hot wire(s).

In some embodiments, the at least one main sub-phase comprises the step of feeding at least one additional cold wire towards the work piece at a constant feed speed and the stable arc phase comprises the step of continuously adjusting the feed speed of said at least one additional cold wire in dependence on at least one hot wire feed speed. One advantage with using more than one cold wire is an increased deposition rate.

The feed speeds of these additional cold wires can be regulated as described above. It is also possible for one cold wire to adopt the feed speed of another cold wire. The feed speeds of more than one cold wire can be determined in dependence on the same welding parameters or different welding parameters.

Advantageously, an increase or reduction of the cold wire feed speed during the arc-stabilizing phase is carried out as quickly as possible and preferably more or less instantaneously, to minimize the negative effect of the cold wire on the arc-stabilization process and, in some embodiments, to make sure that welding may be carried out as early as possible with the best possible result.

Instantaneous adjustments are carried out as quickly as allowed by the welding apparatus.

Hot and cold wire feed speed adjustments during the arc-stabilizing phase are executed as quickly as possible. Preferably, a wire reaches its new feed speed within 100 ms and more preferably within 10 ms. The time required for the wire to reach its target feed speed depends on several parameters, e.g. the diameter of the wire and the type of motor arranged to drive the wire feeding means. Nevertheless, a wire may for a short period of time at the beginning and/or end of a sub-phase have a feed speed that differs from the otherwise constant feed speed of said sub-phase. In this specification, a wire is considered to be fed at a constant feed speed throughout a sub-phase even if the feed speed of said wire is adjusted at the very beginning and/or end of said sub-phase.

An arc may become unstable following an adjustment of the hot wire feed speed. This may lead to a temporarily reduced melting rate. During the stable arc phase, it is advantageous if the cold wire feed speed is increased at a rate lower than the corresponding increase rate of the hot wire feed speed. This will ensure that the cold wire does not hit the bottom of the weld pool due to a temporarily reduced melting rate. One way of ensuring that the cold wire feed speed is not increased too quickly during the stable arc phase is to increase the cold wire feed speed in steps until the cold wire has reached its target value. The cold wire feed speed is advantageously increased in steps having a mean height of up to 100 cm/min, advantageously 1-10 cm/min and even more advantageously 4-6 cm/min, and a mean length of 10-1000 ms, advantageously 50-500 ms and most preferably 75-125 ms. It is also possible to delay the initiation of the increase of the cold wire feed speed. A reduction of the cold wire feed speed during the stable arc phase should be executed as quickly as possible, to ensure that the cold wire feed speed is immediately adapted to a lower melting rate. Advantageously, the new and lower target value for the cold wire feed speed is reached within 200 ms, preferably within 100 ms, more preferably within 10 ms and most preferably within 1 ms with respect to the occurrence of the hot wire feed speed adjustment causing said reduction.

The welding apparatus may be provided with one or more means for measuring the welding current, or an active welding parameter related to the welding current, during the stable arc phase. These values are filtered and used to determine new target values for the hot wire feed speed.

The welding apparatus may also be provided with one or more measuring means arranged to measure a hot wire feed speed, or one or more active welding parameters related to and indicative of the hot wire feed speed, during the welding process. Measured values are stored in the control unit. The time interval between active welding parameter measurements is advantageously as short as possible, at least during the stable arc phase when the hot wire feed speed is continuously adjusted in dependence on welding current variations. A suitable time interval is about 1 ms. The measured values may be filtered to achieve a more accurate adjustment of the cold wire feed speed. A filtered value is compared to the last stored value and thus it can be determined whether the cold wire feed speed should be increased or reduced. The last measured filtered value is used to determine a new target value for the cold wire feed speed. Active welding parameter values used to determine corresponding target values for the cold wire feed speed are advantageously measured at intervals having a mean length of 10-1000 ms, preferably 50-500 ms and most preferably 75-125 ms. Consequently, the cold wire feed speed may be adjusted in steps having a mean length of 10-1000 ms, advantageously 50-500 ms and most preferably 75-125 ms. It is of course possible to increase the time interval between the measurements of the active welding parameter to up to 1000 ms. Should a new welding parameter value, measured during a hot wire feed speed adjustment, indicate that the welding parameter has changed during said adjustment, then a new target value for the hot wire feed speed is determined and the hot wire feed speed is adjusted accordingly. Similarly, a detected change in hot wire feed speed during a cold wire feed speed adjustment will lead to an adjustment of the cold wire feed speed target value.

It is possible, during the stable arc phase, to reduce the cold wire feed speed to a level below the target value, to ensure that the arc is given sufficient time to stabilize and that the cold wire does not hit the bottom of the weld puddle, and then increase the cold wire feed speed to the target value. The cold wire feed speed may even be brought to a halt before being increased to said target value.

Advantageously, the control unit adapted to determine new target values for the cold wire feed speed immediately following a transition from the arc-stabilizing phase (CW) to the stable arc phase (CA) is adapted to compare the hot wire feed speed of the last sub-phase of the arc-stabilizing phase to the hot wire feed speed first measured during the stable arc phase. An increase of the cold wire feed speed at the transition from the arc-stabilizing phase to the stable arc phase can be delayed, for example with 0.5-1.5 seconds, to ensure that a stable arc is present when the cold wire reaches its new, higher target value. A reduction of the cold wire feed speed following the transition from the arc-stabilizing phase to the stable arc phase is, preferably, instantaneous, to prevent the cold wire from hitting the weld puddle before it reaches its new, lower target value.

The welding apparatus may also be provided with other measuring means, for measuring other welding parameters.

The second object of the invention is achieved by means of a welding apparatus for carrying out the above described method. The welding apparatus comprises a hot wire feeding means for feeding at least one hot wire towards a work piece, a contact means for transferring welding current to said hot wire for arc generation, a cold wire feeding means for feeding at least one cold wire towards said work piece and a control unit adapted to control said hot and cold wire feeding means during an arc ignition phase, an arc-stabilizing phase and a subsequent stable arc phase. The arc-stabilizing phase comprises at least one initial sub-phase and at least one subsequent main sub-phase. The control unit is adapted to control the hot wire feeding means to feed the hot wire at a constant feed speed during the initial sub-phase, feed the hot wire at a constant feed speed during the main sub-phase and to continuously during the stable arc phase adjust the feed speed of the hot wire in dependence on at least a welding current transferred through said hot wire. The control unit is also adapted to control said cold wire feeding means to feed at least one cold wire at a constant feed speed during the main sub-phase and to continuously during the stable arc phase adjust the feed speed of the cold wire in dependence on at least one hot wire feed speed.

The welding apparatus according to the invention ensures high weld quality also at the beginning of a welding process including one or more cold wires. This is achieved by feeding the hot wire at constant wire feed speed during at least one initial sub-phase and one main sub-phase of the arc-stabilizing phase and by feeding the cold wire at a constant wire feed speed during at least one main sub-phase of the arc-stabilizing phase, to ensure a relatively quick generation of a stable arc between the hot wire and the work piece (or a plurality of arcs between a plurality of hot wires and said work piece).

The welding apparatus also makes it possible to minimize or eliminate the negative impact of the cold wire during at least the beginning of the arc-stabilizing phase. The control unit prevents the cold wire from reaching the weld puddle during at least one initial sub-phase of the arc-stabilizing phase, or at least prevents it from reaching the weld puddle at a feed speed at which the cold wire may have a serious negative impact on the arc-stabilizing process. Preferably, the control unit is adapted to maintain the cold wire feed speed in a direction towards the work piece equal to or below 9 cm/min during at least the initial sub-phase. More preferably, the control unit is adapted to keep the at least one cold wire stationary during the initial sub-phase. This arrangement ensures that the arc-stabilization process is not negatively influenced by the cold wire during the first stage(s) of the arc-stabilizing phase.

The control unit may be adapted to control said hot wire feeding means to provide one hot wire feed speed during one first sub-phase and another hot wire feed speed during another sub-phase. This arrangement makes it possible to stepwise increase or reduce the hot wire feed speed (and thus also the cold wire feed speed) during the arc-stabilizing phase, which may have a positive effect on the arc-stabilization process.

Alternatively, the control unit may be adapted to provide the same hot wire feed speed throughout the arc-stabilizing phase, which makes it possible to initiate the welding phase at the same time as the arc-stabilizing phase. In this case, it is advantageous if the feeding of the cold wire is delayed, preferably with 0.5-5 seconds and more preferably with 2-3 seconds, to facilitate a quick generation of a stable arc.

The control unit may be adapted to determine an expected stable arc phase feed speed of the hot wire corresponding to a stable arc phase welding current. Advantageously, the hot wire during the arc-stabilizing phase is in the range 0-200%, preferably in the range 0-100%, of said expected stable arc phase hot wire feed speed. It is even more preferable if the control unit is adapted to keep the feed speed of the hot wire during the last sub-phase of the arc-stabilizing phase in the range 80-95% of the expected stable arc phase hot wire feed speed.

A hot wire feed speed lower than the expected stable arc phase hot wire feed speed ensures that the distance between the tip of the hot wire and the work piece remains large, which facilitates the generation of a stable arc. For this reason, it is advantageous if the hot wire feed speed(s) remains below the expected stable arc phase hot wire feed speed during the entire arc-stabilizing phase. For this reason, it may also be advantageous if the hot wire feed speed is significantly lower than the expected stable arc phase hot wire feed speed during the first part of the arc-stabilizing phase. However, it is also advantageous if the difference between the expected stable arc phase hot wire feed speed and the constant hot wire feed speed during the last sub-phase is relatively small, to facilitate the transition from the arc-stabilizing phase to the stable arc phase. Thus, it is advantageous if the hot wire feed speed can be adjusted in steps during the arc-stabilizing phase. Once a stable arc has been generated, it is no longer necessary to maintain a low hot wire feed speed and the welding apparatus switches to a CA process wherein the hot wire feed speed is adjusted to maintain the welding amperage at a set level (the stable arc welding current).

It may also be advantageous if the hot wire feed speed is higher than the expected stable arc phase hot wire feed speed, and perhaps also gradually reduced during the arc-stabilizing phase, to ensure the generation of a stable arc. This is the case when the stable arc phase welding current is too low to ensure that a stable arc will be generated.

Advantageously, each constant feed speed of the cold wire during the arc-stabilizing phase is in the range 0-200%, preferably in the range 0-100%, of a corresponding hot wire feed speed. The control unit may also be adapted to keep the cold wire feed speed, at least during the last sub-phase, in the range 70-90% of the corresponding hot wire feed speed, to facilitate the transition from the arc-stabilizing phase to the stable arc phase.

Advantageously, a user enters one or more welding parameter values before the welding process begins. Examples of suitable welding parameters are welding current, arc voltage and hot wire travelling speed. The control unit uses said welding parameter values to determine suitable feed speeds for the hot and cold wires.

In embodiments wherein the hot wire feed speed may change from sub-phase to sub-phase, the user may enter sub-phase-specific welding parameter values to be used to determine a suitable hot wire feed speed for each sub-phase. It is also possible, in alternative embodiments, for the user to enter suitable hot and cold wire feed speeds for the arc-stabilizing phase.

Advantageously, the control unit is adapted to provide the arc-stabilizing phase with a predetermined length in the range 1-6 seconds and more advantageously in the range 1-3 seconds, to ensure that a stable arc is present when the welding process enters the stable arc phase.

The initial sub-phase advantageously has a predetermined length in the range 0.5-5 seconds.

The welding apparatus may comprise at least one stable arc detection means arranged to detect a stable arc and the control unit may be adapted to initiate the stable arc phase when it receives a signal from said stable arc detection means indicating that a stable arc has been detected. This allows for an optimization of the length of the arc-stabilizing phase.

The welding apparatus may comprise one or more measuring means arranged to measure one or more active welding parameter values. These measuring means may form part of the control unit but they may also be separately arranged, in which case they are connected to the control unit so as to be able to send relevant information to said control unit.

Said measuring means may be arranged to measure the hot wire feed speed. For example, said measuring means may comprise a sensor adapted to measure the rotational speed of a motor shaft in a motor arranged to feed a hot wire towards a work piece and transfer this information to said control unit, which calculates the hot wire feed speed. It is also possible to use one or more sensors that measure the feed speed directly on the hot wire.

One or more measuring means may be adapted to measure the welding current. For example, said measuring means may comprise one or more shunts in the power source. The shunt is placed in series with a load so that all of the current to be measured will flow through it. The voltage drop across the shunt is proportional to the current flowing through it and the shunts resistance is known, wherefore measuring the voltage allows for determination of the welding current.

Said measuring means may also be adapted to measure arc voltage. Arc voltage is advantageously measured between the work piece and the closest end of the hot wire to avoid voltage drop.

Of course, said measuring means can be arranged to measure other active or non-active welding parameters and the control unit may use these measured welding parameter values to determine, for example, welding current, arc voltage and hot wire travelling speed, which may be used to determine suitable hot and cold wire feed speeds.

The welding apparatus may also comprise at least one arc detection means adapted to detect the presence of an arc during the arc ignition phase. In this embodiment, the control unit is advantageously adapted to initiate the arc-stabilizing phase immediately upon receiving a signal from said arc detection means indicating the presence of an arc.

For example, an arc is considered to be established when the welding current amperage level exceeds a pre-set level for a time interval exceeding a pre-set time. This detection means may form part of the control unit. It may also be separate from and connected to the control unit.

The welding apparatus may comprise one or more hot wire feeding means for feeding one or more hot wires towards the work piece and additional contact means for transferring welding current to said hot wires. The control unit is suitably adapted to control said hot wire feeding means to feed said hot wires at constant feed speeds during the at least one initial sub-phase, at constant feed speeds during the at least one main sub-phase and to continuously during the stable arc phase adjust the feed speeds of each of said hot wires in dependence on at least a welding current transferred through said hot wire.

The welding apparatus may also comprise one or more cold wire feeding means for feeding one or more cold wires towards the work piece. The control unit is suitably adapted to control said cold wire feeding means to feed said cold wires at constant feed speeds during the at least one main sub-phase, and to continuously adjust the feed speeds of said cold wires in dependence on at least one corresponding hot wire feed speed during the stable arc phase.

Advantageously, any additional hot and cold wire feeding means is controlled in the same manner as described with reference to the other hot and cold wire feeding means.

The addition of one or more hot wires increases the deposition rate. However, the addition of additional hot wires may also make the generation of stable arcs during the arc-stabilizing phase more difficult. An arc generated by a hot wire may affect arcs generated by other hot wires and prevent these arcs from stabilizing. The welding apparatus according to the invention solves this problem by feeding the hot wires at constant feed speeds during sub-phases of the arc-stabilizing phase, thus creating welding conditions that facilitates generation of stable arcs. The constant hot wire feed speeds are chosen so that stable arcs may be easily generated.

A hot wire feeding means may be adapted to feed one or more hot wires towards the work piece. That is, a hot wire feeding means may in one embodiment be adapted to feed a single, first hot wire towards a work piece and in an alternative embodiment be adapted to feed additional hot wires in addition to said first hot wire. It is also possible to use more than one hot wire feeding means, each adapted to feed one or more hot wires, in the same welding apparatus.

Note that two or more hot wires in a welding apparatus need not have the same feed speed, neither during the sub-phases of the arc-stabilizing phase nor during the stable arc phase, and need not have the same wire characteristics, e.g. material properties and wire dimensions. Suitable hot wire feed speeds may be determined individually for each hot wire. It is also possible to determine suitable hot wire feed speeds for one hot wire and apply said feed speeds to one or more additional hot wires.

The presence of additional hot wires provides alternatives for how to regulate the feed speed of a single cold wire. The feed speed of a single cold wire may, during the arc-stabilizing phase, be dependent on the feed speed of a single hot wire or an average feed speed of a plurality of hot wires. The hot wire feed speed values may be weighted before the average hot wire feed speed is calculated. Similarly, during the stable arc phase, the feed speed of a single cold wire may be determined in dependence on one or more active welding parameters indicative of the feed speeds of one or more hot wires. The cold wire feed speed may, for example, be related to a single hot wire feed speed or to a plurality of hot wire feed speeds.

The control unit may be a single unit or comprise a plurality of sub-units located at different locations.

As mentioned, the welding apparatus may also comprise cold wire feeding means for feeding a plurality of cold wires towards the work piece. Two or more cold wires in a welding apparatus need not have the same feed speed, neither during the sub-phases of the arc-stabilizing phase nor the stable arc phase. For example, the individual feed speeds of two cold wires may be related to different welding parameters, e.g. the feed speeds of different hot wires. It is also possible to determine the cold wire feed speed for a single cold wire and apply the same feed speed to all cold wires. It is also possible to use the same welding parameter values when the feed speeds of two or more cold wires are calculated, which cold wires may have different dimensions and/or material properties and serve different functions and thus be assigned different feed speeds.

BRIEF DESCRIPTION OF THE DRAWINGS

The present invention together with the above-mentioned and other objects and advantages may best be understood from the following detailed description of exemplary embodiments of the invention. The detailed description contains references to drawings, wherein.

DETAILED DESCRIPTION OF PREFERRED EMBODIMENTS OF THE INVENTION

Figure 1:
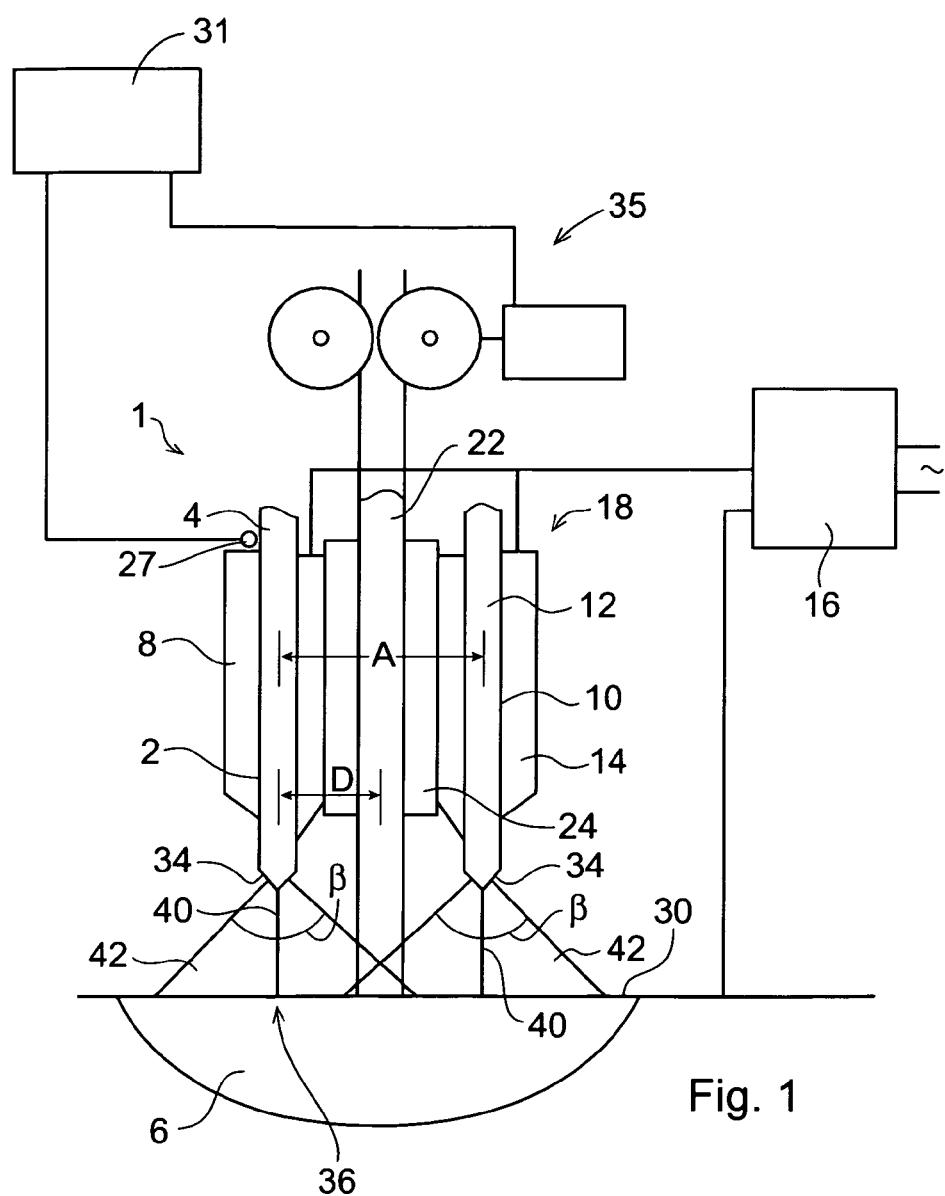
FIG. 1 shows a twin wire welding apparatus according to the invention.

In the drawings, equal or similar elements are referred to by the same reference numerals. The drawings are merely schematic representations and not intended to portray specific parameters of the invention. Moreover, the drawings are intended to depict only typical embodiments of the invention and therefore should not be considered as limiting the scope of the invention.

FIG. 1 shows portions of a twin welding apparatus 1. The twin welding apparatus includes a first contact tube 2 for guiding a first hot wire 4 towards a weld puddle 6. The first contact tube 2 is arranged in a contact tip 8 in a conventional manner. Welding current is transferred through said contact tube 2 to the first hot wire 4. A second contact tube 10 is arranged in the twin wire welding apparatus 1 for guiding a second hot wire 12 towards the weld puddle 6. The second contact tube 10 is arranged in a contact tip 14 in a conventional manner. The first and second contact tips 8, 14 may be arranged in a single body, which may be aggregated by parts, or in separate bodies. At the second contact tube 10, welding current is transferred to the second hot wire 12.

A single power source 16 is connected to a contact device 18 including the contact tips 8, 14 and housing the first and second contact tubes 2, 10. The single power source 16 provides the same potential to the first and second hot wires 4, 12. The power source may be of any conventional type operable for twin wire welding, such as a welding converter, a welding transformer, a rectifier, a thyristor controlled rectifier or an inverter.

The twin wire welding apparatus 1 further includes a feeding arrangement for feeding a cold wire 22 into the weld puddle 6. The feeding arrangement includes a tube 24, which is electrically insulated from the first and second contact tips 8, 14. The cold wire 22 is fed via the tube 24. When welding, arcs 40 will be present at the first and second hot wires 4, 12, but not at the cold wire 22. The cold wire 22 is melted by introduction of the cold wire into areas of the arcs 40. Suitably, the cold wire 22 is not connected to any electrical power source and will therefore generally assume a ground potential. However, it may be possible to connect the cold wire 22 to a power source for pre-heating the cold wire. However, the cold wire 22 will not be connected to a power source for the purpose of arc generation. The tube 24 may be a metallic tube that is isolated from the first and second contact tips 8, 14, or a ceramic tube.

In submerged arc welding an arc is present between the tip of a hot wire and the work piece. The arc and the melted material are protected beneath a layer of pulverized flux. The flux melts in part during the process, thus creating a protecting layer of slag on the weld puddle.

An arc 40 is shown in FIG. 1. The contact of the arc 40 at the working piece will be moving in a random manner. However, normally it is assumed that the arc 40 is present within a cone 42 extending from a tip 34 of the hot wire to the weld puddle 6. The opening angle $\beta$ of the cone 42 may vary from welding case to welding case. However, a normal opening angle $\beta$ is around 30°. For this reason it is preferable to locate the cold wire 22 such that it enters the arc area in an essentially orthogonal direction thereto at an axial distance D being less than $L*\cotan(\beta/2)$ from the consumable electrode measured at the tip 34 of the consumable electrode. Here L is the arc length, which is the distance from the electrode tip 34 to the closes point 36 of the weld puddle.

A flux hopper (not shown) is arranged to feed granular flux to a contact device 160 that holds the hot wires 4, 12 and the cold wire 22. The granular flux is fed to the contact device 160 via a nozzle (not shown).

It may be preferable to arrange the cold wire 22 in between the two hot wires 4, 12. The hot wires 4, 12 are preferably mounted at an axial distance A being less than a cone diameter measured at the surface 30 of the weld puddle 6. With this arrangement, the cold wire 22 will be introduced into the outer parts of the arc area defined by the cones 42 of both hot wires 4, 12, which is beneficial for the weld result.

The twin wire welding apparatus 1 further comprises a sensor 27 for measuring the feed speed of the first hot wire 4. Of course, it is possible to employ more than one sensor and to measure the feed speed of both hot wires. However, in twin welding, when two hot wires are connected to the same power source, the hot wires are often considered as a single hot wire and only one sensor is required. In alternative embodiments, the sensor 27 may be replaced by any suitable measuring means adapted to measure other welding parameters.

The twin wire welding apparatus 1 also comprises arc detection means (not shown) for detecting an (unstable) arc between the hot wire 4 and the work piece.

The twin wire welding apparatus 1 in FIG. 1 is adapted to carry out a welding process comprising an ignition phase and a welding phase. The twin wire welding apparatus is a CA welding apparatus. The twin wire welding apparatus 1 is also adapted to carry out an arc-stabilization process, starting with an ignition phase, followed by an arc-stabilizing phase comprising two sub-phases (an initial sub-phase and a main sub-phase), and a stable arc phase. The welding apparatus 1 is a CA welding apparatus. However, the automatic self-regulation of the feed speeds of the hot wires 4, 12 will be turned off during the arc-stabilizing phase so that the feed speeds of the hot wires 4, 12 remain constant during each sub-phase of the arc-stabilizing phase. Note that hot wires in a twin wire welding apparatus are considered as a single hot wire; that is, the hot wires 4, 12 will always assume the same feed speeds. The cold wire 22 will be fed towards the work piece during the main sub-phase only and the feed speed of the cold wire 22 is dependent on the measured feed speed of the first hot wire 4 during said main sub-phase. Consequently, the feed speed of the cold wire 22 will remain constant during the main sub-phase. The welding process carried out during the stable arc phase is a CA welding process, during which the feed speed of the hot wires 4, 12 are adjusted to compensate for disturbances to maintain the welding current amperage at an essentially constant level.

Before the welding process begins, a user of the welding apparatus 1 enters a welding current value to be maintained during the stable arc phase. This welding current value is called the stable arc phase welding current. The user may enter additional welding parameters, e.g. arc voltage and wire travel speed. A control unit 31 uses said information and a table of values to calculate an appropriate arc-stabilizing phase feed speed value for the two hot wires 4, 12 (the hot wire feed speed remains constant throughout the arc-stabilizing phase) and a main sub-phase feed speed value for the cold wire 22. Thereafter, the arc ignition phase is initiated and the arc ignition phase is followed by the initial sub-phase, initiated upon detection of the presence of an arc between the first hot wire and the work piece by means of said arc detection means. In this embodiment, the arc-stabilizing phase has a predetermined length of 2.5 seconds. When the arc-stabilizing phase is over, it is assumed that a stable arc has been generated and that the CA welding process may commence.

Observe that welding is carried out during both the arc-stabilizing phase and the stable arc phase.

During the stable arc phase, the sensor 27 continuously, with intervals of about 1 millisecond, measures the feed speed of the hot wire 4 and transfers measured hot wire feed speed values to the control unit 31. The control unit 31 filters the received values; the values to be subsequently used to control the feed speed of the cold wire 22 are measured at intervals having a mean length of between 75-125 milliseconds. For each filtered value, the control unit 31 determines a corresponding feed speed target value for the cold wire 22.

The control unit 31 also determines whether the target value is higher or lower than the current cold wire 22 feed speed. A reduction of the cold wire 22 feed speed is advantageously carried out as quickly as possible; whereas an increase of the cold wire feed speed should be delayed with a time period dependent on the size of said increase, to ensure that the arcs 40 are stable before the cold wire 22 feed speed reaches its target value.

A signal is sent from the control unit 31 to a cold wire feeding means 35 disposed for feeding the cold wire 22 towards the work piece. The cold wire feeding means 35 increases or reduces the feed speed of the cold wire 22 in accordance with instructions from the control unit 31.

Figure 2:
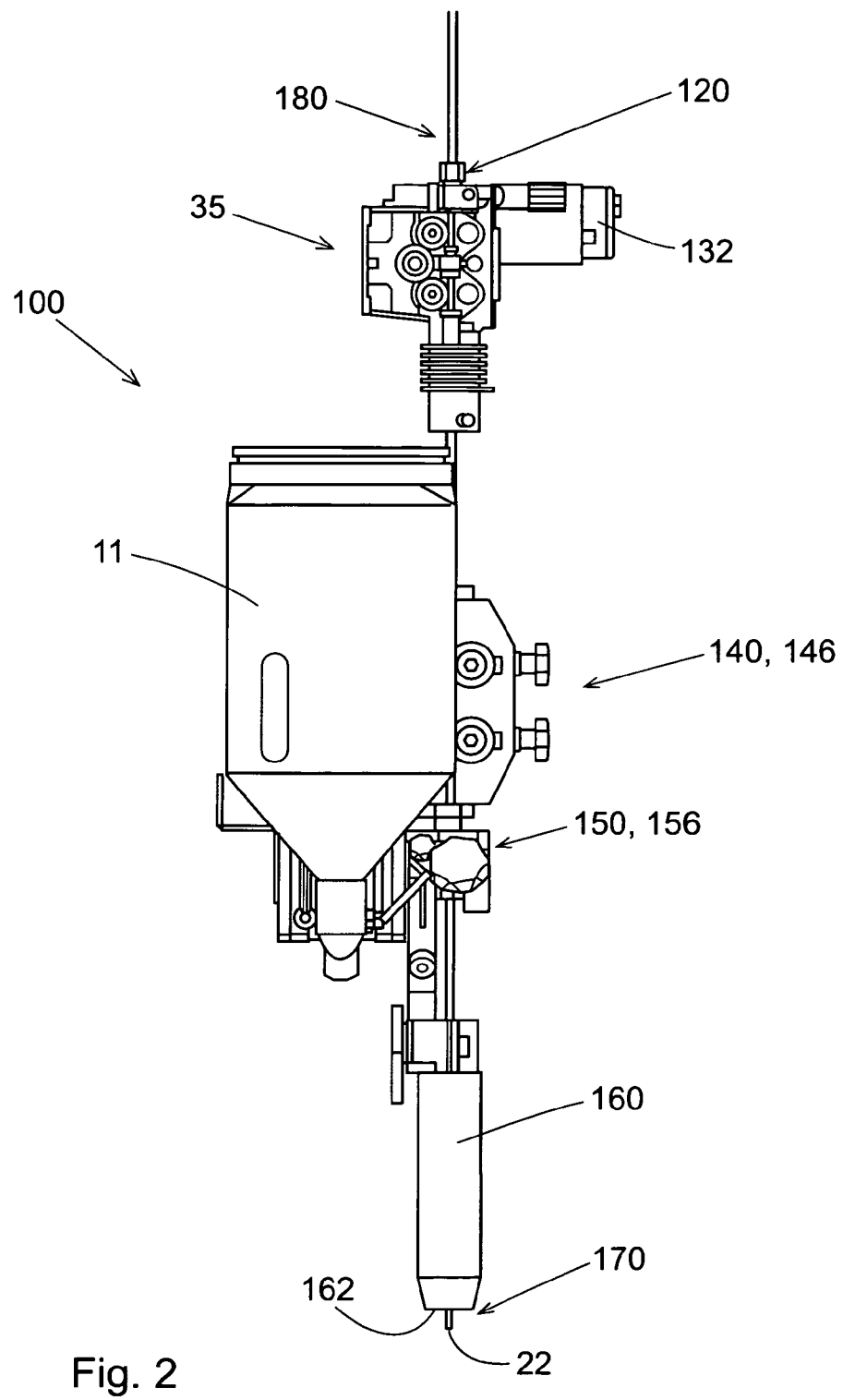
FIG. 2 shows a welding head according to the invention.
Figure 3:
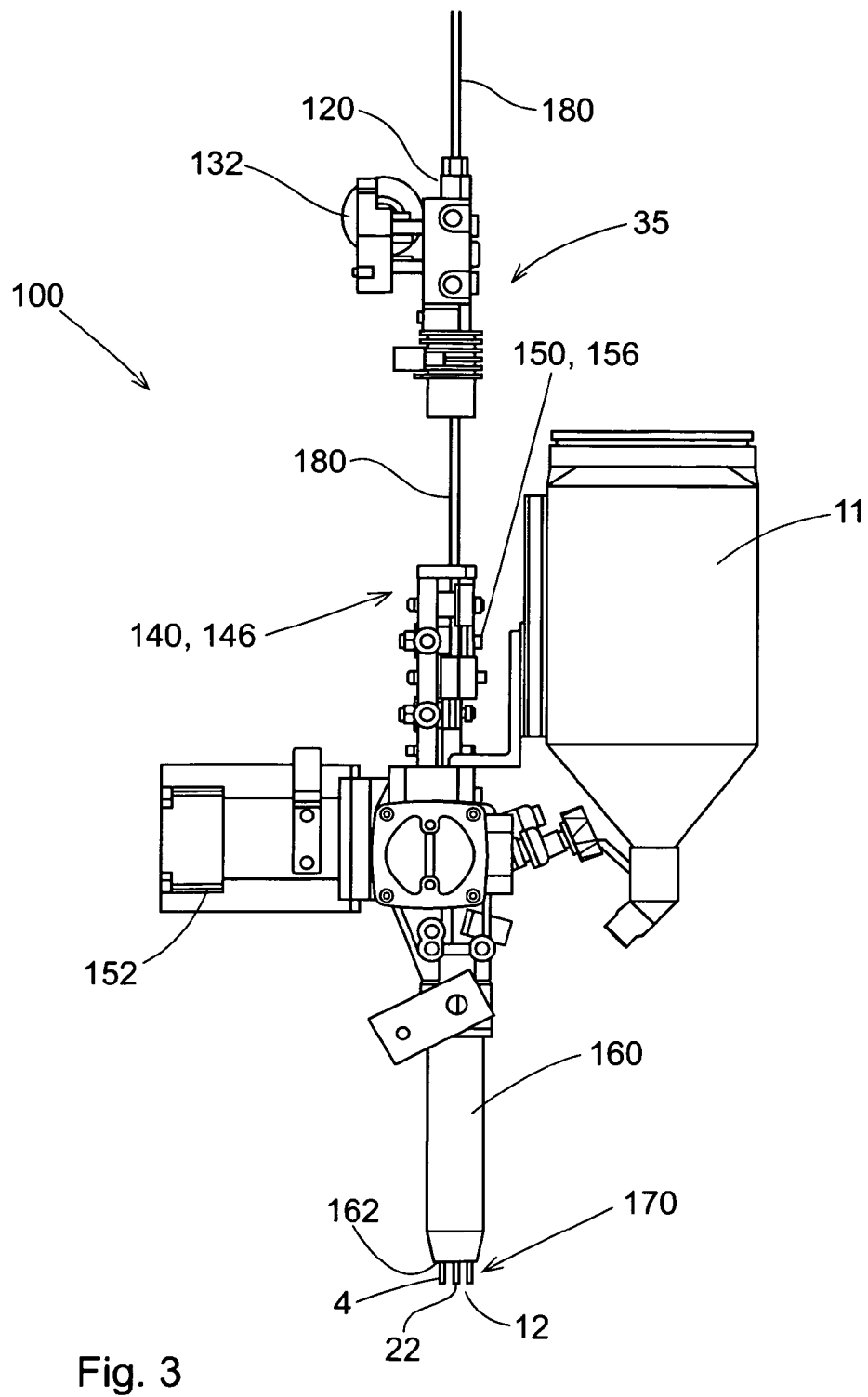
FIG. 3 shows the welding head in FIG. 2 turned counter-clockwise by 90°.
Figure 4:
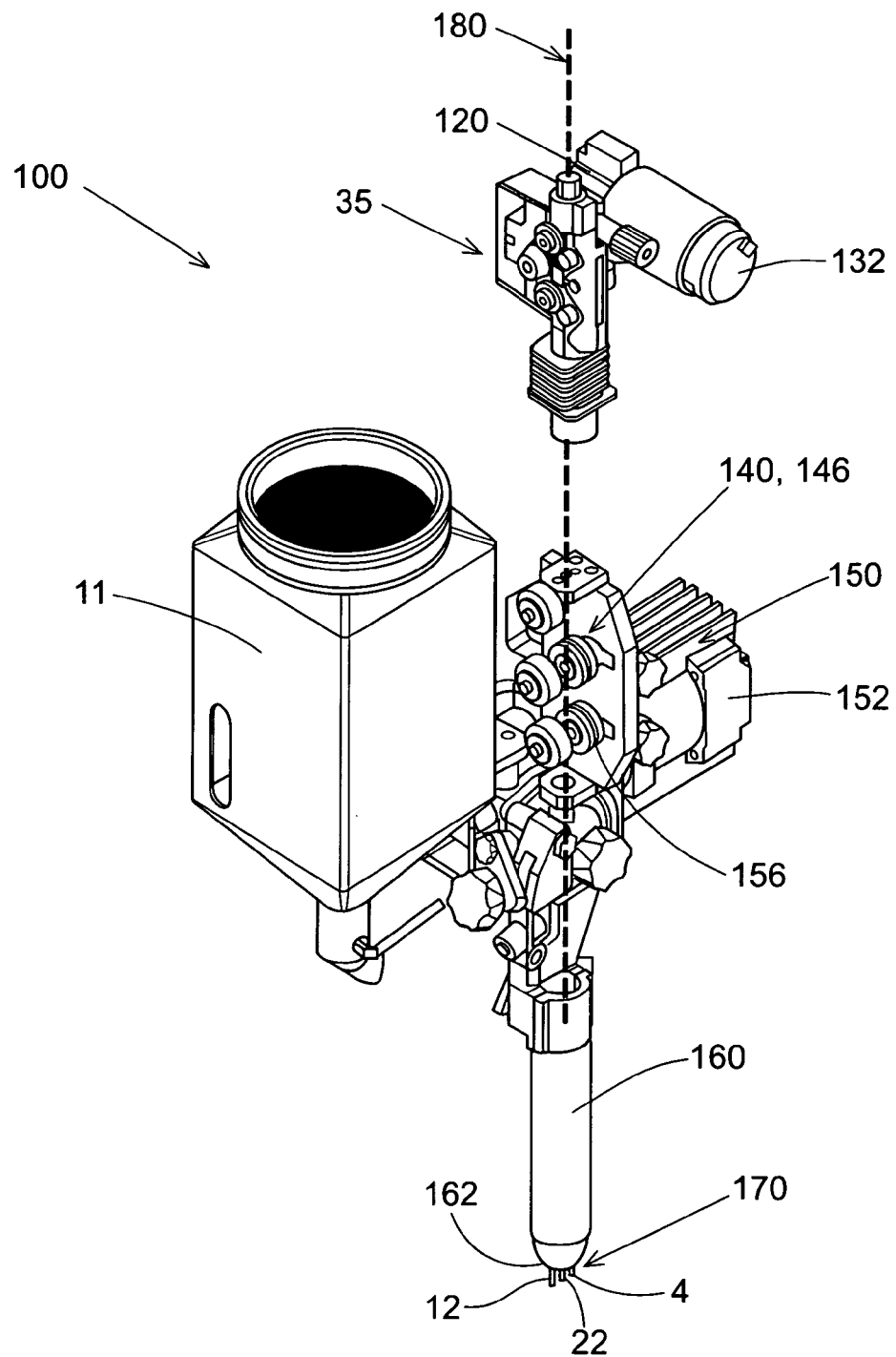
FIG. 4 shows a perspective view or the arc-welding head in FIG. 2.

FIGS. 2 to 4 depict different views of an electric arc-welding welding head 100 for the twin welding apparatus 1 in FIG. 1.

At one end, the welding head 100 comprises a contact device 160, which during welding is in close proximity to the work piece to be welded. The contact device 160 holds a wire assembly 170 comprising the wires 4, 22, 12 (only the cold wire 22 is shown in FIG. 2). The wires 4, 22, 12 exit the contact device 160 through an outlet 162 at the lower end of the contact device 160 facing the work piece during welding. The wires 4, 22, 12 may be fed from respective reservoirs such as coils (not shown) towards the arc welding head 100.

As mentioned above, the wire assembly 170 comprises two hot wires 4, 12 and a cold wire 22 arranged in the contact device 160. The hot wires 4, 12 are arranged as so called twin wires, which are fed in parallel as a double wire arrangement.

Above the contact device 160 a feeder means 150 is arranged which feeds the hot wires 4, 12 towards the contact device 160. Typically, the feeder means 150 comprises grooved wheels which move the hot wires 4, 12 towards the contact device 160. The feeder means 150 comprises an electrically insulating portion 156 for feeding through the cold wire 22. The electrically insulating portion 156 can consist of feeder wheels with an extra insulated groove for the cold wire 22. The cold wire 22 can pass through the wire feeding means 150 freely. The feeder wheels are driven by a driving unit 152 (not shown in FIG. 2), e.g. an electric motor.

The flux hopper 11 feeds granular flux to the contact device 160 via a nozzle (not shown).

Besides the driving unit 152 the wire feeding means 150 comprises a gear with a drive shaft. On the drive shaft of the gear a feeding wheel 154 (FIG. 5) is arranged, which can be pressurized by another wheel (not shown). The feeding wheel 154 drives the wire forward in the direction of the contact device 160.

A wire straightening unit 140 is arranged above the wire feeding means 150 for straightening the hot wires 4, 12. Two rollers depicted in a foremost position of the wire straightening unit 140 are used to exert a pressure on three fixed wheels arranged vertically one over the other in the rear part of the wire straightening device. The pressure the rollers are exerting on the wheels is adjustable via knobs at the outside of the wire straightening unit 140. The pressure of the rollers on the three wheels is straightening the wire. The wire straightening unit 140 comprises an electrically insulating portion 146 through which the cold wire 22 can pass freely through the wire straightening unit 140.

Above the wire straightening unit 140 a separate wire feeding means 35 is disposed for feeding the cold wire 22 towards the contact device 160. On the wire feeding means 35 a driving unit 132, e.g. an electric motor, is arranged to drive feeder wheels of the wire feeding means 35. Besides the driving unit 132, the wire feeding means 35 comprises a gear with a drive shaft. On the drive shaft of the gear a feeding wheel 134 (FIG. 5) is arranged, which can be pressurized by another wheel (not shown). The feeding wheel 134 drives the cold wire 22 forward in the direction of the contact device 160.

Above the wire feeding means 35 a separate wire straightening unit 120 is arranged for straightening the cold wire 22. Along the longitudinal extension of the welding head 100 an electrically insulating duct 180 is provided for guiding the cold wire 22 from a wire reservoir such as a wire bobbin (not shown) to the contact nozzle. Between the feeder means 150 and 130 and above the wire straightening unit 120 an electrically insulated wire conduit can be arranged which receives the cold wire 22.

Particularly, the electrically insulating duct 180 consists of the electrically insulating portion 146 of the wire straightening unit 140, the electrically insulating portion 156 of the wire feeding means 150 for the non-insulated hot wires 4, 12, and the electrically insulated portion of the contact device 160 as well as electrically insulated wire conduits between the units 130, 140, 150, 160 and above the wire straightening unit 120 for the electrically insulated cold wire 22.

A detailed description of suitable contact devices for the hot and cold wires is provided in, for example, WO 2012/041375 A1.

As mentioned above, the arc welding apparatus 1 is provided with a sensor for measuring the feed speed of the hot wire 4.

The arc welding apparatus 1 is also provided with arc detection means (not shown) for detecting the presence of an arc between the first hot wire and the work piece.

Figure 5:
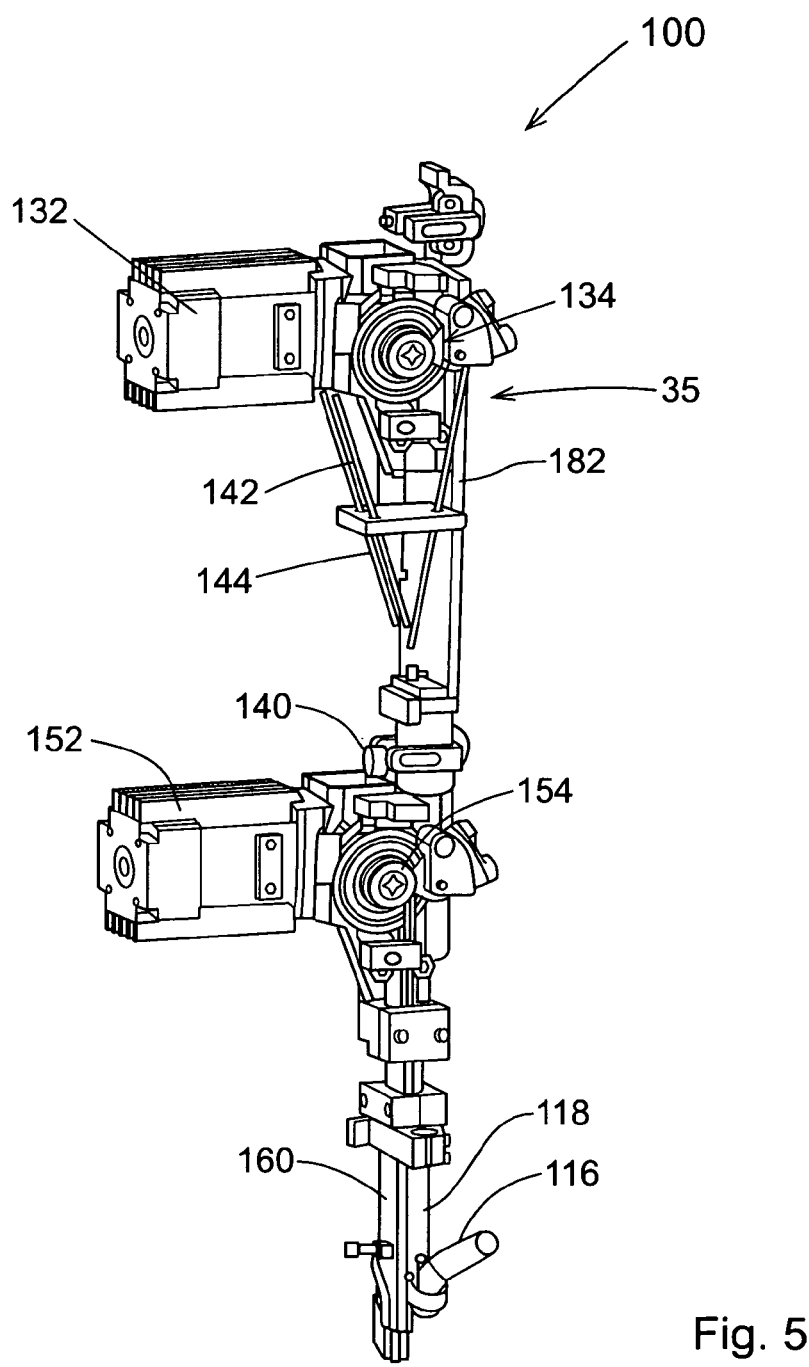
FIG. 5 shows a perspective view of an arc-welding welding head according to the invention.

FIG. 5 is a side view of an arc-welding welding head 100 of virtually the same layout as shown in FIGS. 2-4. Above the wire straightening unit 140 two guide tubes 142, 144 are provided for twin wires. The guide tubes 142, 144 are arranged crosswise to the longitudinal extension of the welding head 100. A guide tube 182 for the cold wire is arranged between the wire feeding means 35 for the cold wire (not shown) and the wire straightening unit 140 for the hot wires (not shown). The driving units 132, 152 can be equipped with pulse sensors for speed control of the wires. Close to the contact device 160 a nozzle 116 for a flux hopper 11 (FIGS. 2-4) is arranged. The nozzle 116 is fixed to a rod 118 arranged parallel to the longitudinal axis of the contact device 160.

Figure 6A:
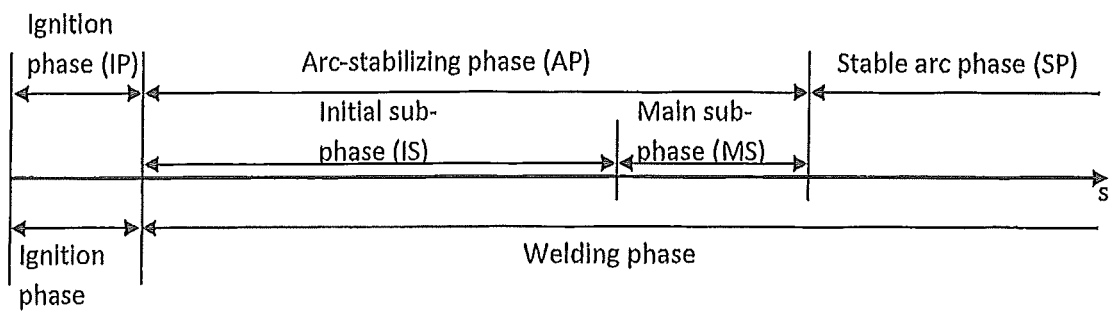
FIG. 6a, b shows schematically different phases of two arc-stabilization process.

FIG. 6a shows schematically the different phases of the submerged arc welding process to be carried out by means of the arc welding apparatus similar to the arc welding apparatus shown in FIG. 1. The cold wire feed speed is determined in dependence on the feed speed of the first hot wire (the same as the feed speed of the second hot wire).

The submerged arc welding process comprises an ignition phase, during which a first (unstable) arc is ignited between the first hot wire and the work piece. The ignition phase is immediately followed by a welding phase, during which welding is carried out on the work piece. The welding phase begins as soon as an arc has been detected.

The welding apparatus is also adapted to carry out an arc-stabilization process comprising an ignition phase (IP), an arc-stabilizing phase (AP) and a stable arc phase (SP). The arc-stabilizing phase (AP) consists of an initial sub-phase (IS) and a main sub-phase (MS). The arc-stabilizing phase (AP) and the welding phase begin simultaneously, that is, welding is carried out during the arc-stabilizing phase (AP). For this reason, it is essential that a stable arc is generated as soon as possible. In this embodiment, the arc-stabilizing phase (AP) has a predetermined length of 2.5 seconds (deemed sufficient to generate a stable arc). The initial sub-phase (IS) has a predetermined length of 2.0 seconds and the main sub-phase (MS) has a predetermined length of 0.5 seconds.

Before the ignition phase (IP) is initiated, the user of the welding apparatus enters a set of welding parameter values including a stable arc phase welding current to be maintained during the stable arc phase (SP). The control unit then determines a hot wire feed speed suitable for the arc-stabilizing phase (AP) to be applied to the first and second hot wires. Note that the hot wire feed speed remains constant throughout the arc-stabilizing phase (AP). Once the arc detection means has detected an arc between the first hot wire and the work piece, the control unit initiates the arc-stabilizing phase (AP). During the initial sub-phase (IS), the hot wires are fed forward at the feed speed determined by means of the control unit whereas the cold wire remains stationary (not fed forward). During the subsequent main sub-phase (MS), the hot wires are fed forward at said constant feed speed and the cold wire is fed forward at a constant feed speed determined in dependence on the constant feed speed of the first hot wire. After 2.5 seconds have elapsed since the beginning of the arc-stabilizing phase (AP), the arc-stabilization process enters the stable arc phase (SP).

The stable arc phase (SP) follows immediately after the arc-stabilizing phase (AP). The feed speed of the hot wires is variable during the stable arc phase (SP) whereas the arc voltage level is kept constant. The feed speed of the hot wires is continually adjusted to maintain the amperage level of the welding current at the set stable arc phase welding current level and compensates for disturbances such as surface irregularities and variations in the welding process. This CA welding process is easy to carry out and provides good welding results.

Figure 6B:
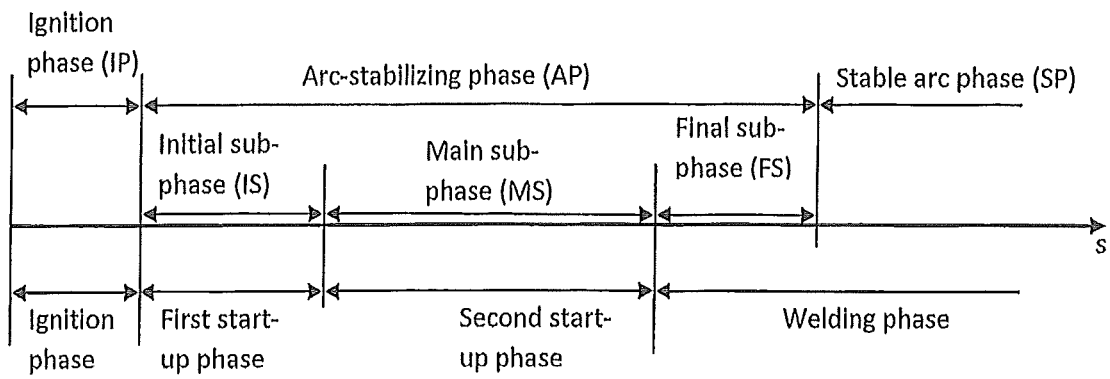

FIG. 6b shows an alternative embodiment of the method according to the invention. In this embodiment, the welding phase is preceded by a first and a second start-up phase and the arc-stabilizing phase (AP) is divided into three sub-phases: an initial sub-phase (IS) corresponding to the first start-up phase, a main sub-phase (MS) corresponding to the second start-up phase, and a final sub-phase (FS) covering the time period between the end of the second start-up phase and the beginning of the stable arc phase (SP).

The purpose of this arrangement is to facilitate the generation of a stable arc and to postpone the welding phase until a stable arc has been generated.

In addition to the stable arc welding current and any additional welding parameter values related to the stable arc phase, the user also enters a plurality of sub-phase specific welding parameters. Examples of suitable welding parameters are welding current, arc voltage and travel speed. Based on these values, the control unit determines a suitable hot wire feed speed for each sub-phase.

The main purpose of the initial sub-phase (IS) is to facilitate the generation of a stable arc. This is achieved by temporarily removing the negative effect of the cold wire on the arc-stabilization process. The cold wire is kept still during the initial sub-phase (IS) whereas the hot wires are fed forward at the constant feed speed determined by the control unit.

The main purpose of the main sub-phase (MS) is to introduce the cold wire into the welding process while ensuring that the arc remains relatively stable. Both the cold wire and the hot wires are now fed forward at constant feed speeds determined by the control unit. In this embodiment, the hot wire feed speed is higher during the main sub-phase (MS) than during the initial sub-phase (IS). The cold wire feed speed is determined in dependence on the corresponding first hot wire feed speed.

The hot wire feed speed applied during the final sub-phase (FS) is higher than the hot wire feed speed applied during the main sub-phase (MS), and thus closer to the expected stable arc phase hot wire feed speed. Thus, a smooth transition from the final sub-phase (FS) to the stable arc phase (SP) is ensured. The cold wire feed speed follows the first hot wire feed speed and is also increased at the beginning of the final sub-phase (FS). In alternative embodiments, the main sub-phase (MS) may be extended to the end of the arc-stabilizing phase (AP).

The method shown schematically in FIG. 6a will now be described more in detail with reference to FIG. 7a. The solid line (A) shows the actual hot wire feed speed during each phase, the solid line (B) shows the actual cold wire feed speed during each phase, and the dotted line (C) shows the expected hot wire feed of the stable arc phase (SP).

Figure 7A:
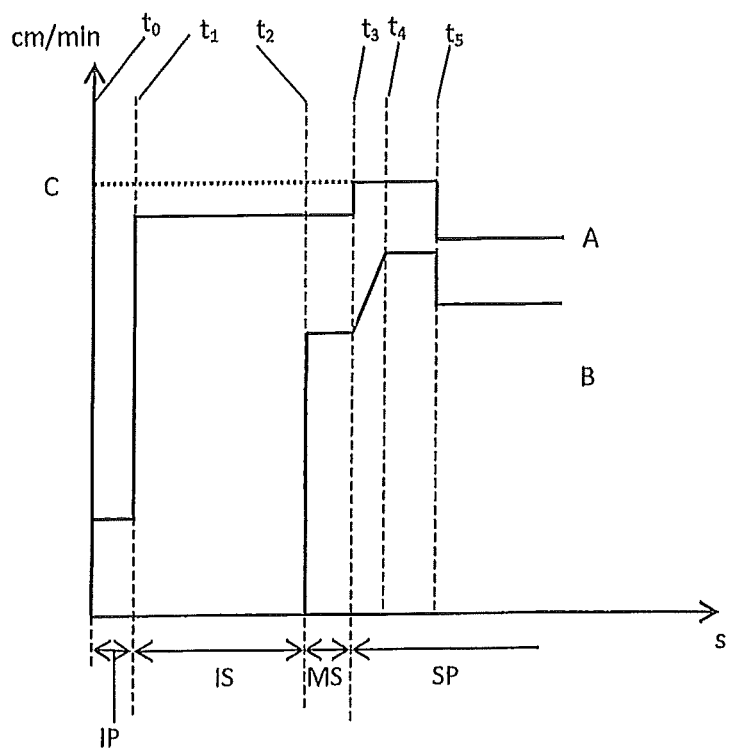
FIG. 7a, b shows how hot and cold wire feed speeds may vary over time.

FIG. 7a shows that the hot wire feed speed during the ignition phase (IP, $t_0$-$t_1$) is set to a value of about 25% of the expected stable arc phase hot wire feed speed (C).

As mentioned, the expected stable arc phase hot wire feed speed (C) is determined by the control unit based on one or more welding parameter values set by the user before the welding process begun. The actual first hot wire feed speed (A) at the beginning ($t_3$) of the stable arc phase (SP) is in this embodiment equal to the expected stable arc phase hot wire feed speed (C). Note that this is not always the case. The actual first hot wire feed speed (A) may differ from the expected stable arc phase hot wire feed speed (C), for example as a consequence of encountered disturbances.

An arc detection means detects an arc and sends a signal to the control unit ($t_1$). The control unit instructs the hot wire feeding means to increase the hot wire feed speed (A) to a value of about 90% of the expected stable arc phase hot wire feed speed (C). The new hot wire feed speed (A) remains constant throughout the initial sub-phase (IS, $t_1$-$t_2$) and the main sub-phase (MS, $t_2$-$t_3$). The cold wire is kept still during the initial sub-phase (IS, $t_1$-$t_2$) and assumes a constant cold wire feed speed (B) during the main sub-phase (MS, $t_2$-$t_3$). The cold wire feed speed (B) during the main sub-phase (MS, $t_2$-$t_3$) is about 70% of the first hot wire feed speed (A) during the main sub-phase (MS, $t_2$-$t_3$).

The arc-stabilization phase (AP, $t_1$-$t_3$) lasts 2.5 seconds and is immediately followed ($t_3$) by the stable arc phase (SP). As the arc-stabilization process enters the stable arc phase (SP), the control unit instructs the hot wire feeding means to apply a feed speed to the first and second hot wires corresponding to the stable arc phase welding current set by the user of the welding apparatus. Thereafter, the amperage level of the welding current is continuously measured and the measured values are filtered in the control unit. The welding current amperage level may vary during the stable arc phase (SP) as a consequence of disturbances and the control unit is programmed to restore the amperage level to the set value (the stable arc phase welding current) through adjustment of the hot wire feed speed (i.e. the control unit is adapted to maintain the amperage level at said set level through regulation of the hot wire feed speed). For example, at $t_5$, the control unit registers an increase of the welding current amperage level and thus instructs the hot wire feeding means to lower the hot wire feed speed (A) in order to restore the amperage level to its previous, lower value.

The first hot wire feed speed is continuously measured during the welding process and the measured values are filtered by the control unit. For each filtered value, the control unit determines a corresponding feed speed target value for the cold wire and the control unit instructs the cold wire feeding means to adjust the cold wire feed speed (B) to said target value. Consequently, at $t_2$ and $t_3$-$t_4$, the cold wire feed speed (B) is increased and at $t_5$ the cold wire feed speed (B) is reduced.

Note that the increase of the cold wire feed speed (B) as the arc-stabilization process enters ($t_3$) the stable arc phase (SP) is executed at a relatively slow rate (in comparison to the almost instantaneous increase of the first hot wire feed speed (A)). The cold wire feed speed (B) reaches its new target value at $t_4$. This delay ensures that the arc is stabilized at the new and higher hot wire feed speed (A) level before the cold wire feed speed (B) reaches its new and higher target value. Note also that a reduction of the cold wire feed speed (B) at $t_5$ is carried almost instantaneously, to avoid a situation wherein the cold wire has a feed speed (B) too high in relation to the hot wire feed speed (A) and strikes through the weld puddle.

The easiest way to determine whether the cold wire feed speed (B) is to be increased or reduced is to store the last measured and filtered first hot wire feed speed (A) value in the control unit and compare it to the next measured and filtered first hot wire feed speed (A) value. Similarly, the last determined cold wire feed speed (B) value can be stored in the control unit and compared to the next determined cold wire feed speed value (B).

At the transition ($t_3$) from the arc stabilizing phase (AP) to the stable arc phase (SP), the control unit compares the first measured and filtered hot or cold wire feed speed value to the corresponding constant feed speed value kept during the main sub-phase ($t_2$-$t_3$) of the arc-stabilizing phase (AP), to determine whether the adjustment of the cold wire feed speed (B) should be carried out instantaneously (a reduction) or with a delay (an increase).

Figure 7B:
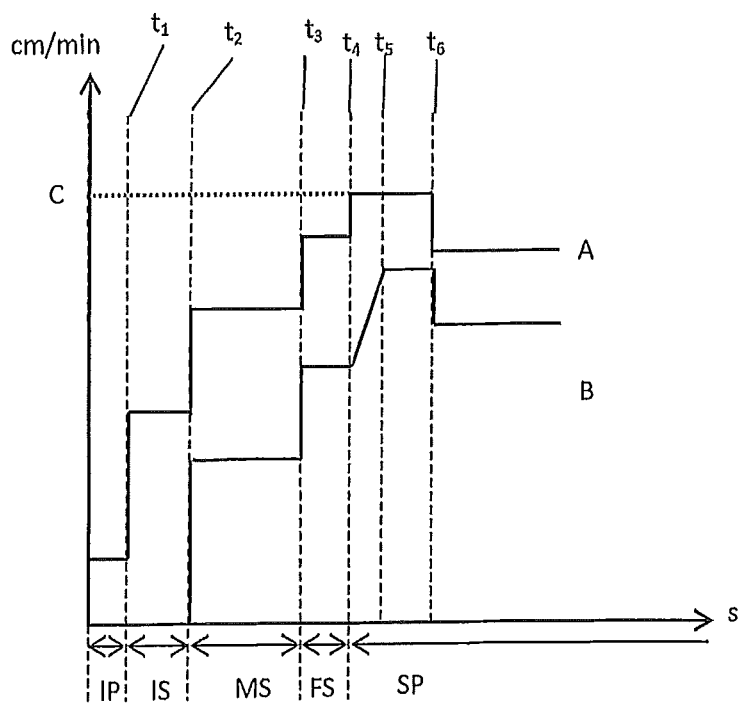

The method shown schematically in FIG. 6b is shown more in detail in FIG. 7b.

The arc-stabilizing phase (AP) in FIG. 7b is divided into three sub-phases: an initial sub-phase (IS, $t_1$-$t_2$), a main sub-phase (MS, $t_2$-$t_3$) and a final sub-phase (FS, $t_3$-$t_4$).

The first hot wire feed speed during the arc ignition phase (IP, $t_0$-$t_1$) is about 25% of the expected stable arc phase hot wire feed speed (C). The hot wire feed speed (A) is increased to about 50% of the expected stable arc phase hot wire feed speed (C) once an arc has been detected ($t_1$) and the arc-stabilization process begins with the initial sub-phase (IS, $t_1$-$t_2$). The cold wire remains stationary to optimize the chances of generating a stable arc during said initial sub-phase (IS, $t_1$-$t_2$). The hot wire feed speed (A) is increased again at the beginning ($t_2$) of the main sub-phase (MS, $t_2$-$t_3$) to about 75% of the expected stable arc phase hot wire feed speed (C). Simultaneously, the cold wire is being fed forward at a feed speed (B) of about 50% of the first hot wire feed speed (A). Thus, the arc is allowed to stabilize in the presence of the cold wire before the stable arc phase (SP) begins. Once the main sub-phase (MS, $t_2$-$t_3$) has come to an end and the final sub-phase (FS, $t_3$-$t_4$) begins, the hot wire feed speed (A) is increased again to about 90% of the expected stable arc phase hot wire feed speed (C) and the cold wire feed speed (B) is increased to 70% of the first hot wire feed speed (A). Finally, at the beginning of the stable arc phase (SP), the first hot wire feed speed (A) is released and the cold wire feed speed (B) is continuously adapted to the first hot wire feed speed, as described above with reference to FIG. 7a.

In this embodiment, the hot wire feed speed (A) is increased every time the arc-stabilization process enters a new sub-phase (the same is true for the cold wire feed speed with exception for the transition from the arc ignition phase (IP) to the initial sub-phase (IS)). The hot wire and cold wire feed speeds remain constant during each sub-phase. The hot wire feed speed (A) levels are determined by the control unit based on the welding parameter values set by the user before the welding process began and the cold wire feed speed (B) values are determined in dependence on the corresponding first hot wire feed speed (A) values. During the stable arc-phase (SP), target values for cold wire feed speed (B) is determined by means of the control unit based on measured first hot wire feed speed (A) values.

The scope of protection provided by the claims is not limited to the above described embodiments. Embodiments and features can be combined in many ways without falling outside the scope of protection.

For example, a change in welding conditions during the arc-stabilizing phase may cause the hot wire feed speed to be reduced when the arc-stabilization process enters the stable arc phase. There are also embodiments wherein the stable arc phase welding current to be maintained during the stable arc phase is so low that it may be advantageous to apply a hot wire feed speed higher than the expected stable arc phase hot wire feed speed during the arc-stabilizing phase. The methods described above with reference to FIGS. 6a, b; 7a, b can be applied on a welding apparatus comprising any number of hot wires and more than one cold wire. A hot wire may have the same feed speed in two or more sub-phases, and a cold wire may have the same feed speed in two or more sub-phases. The arc-stabilizing phase in FIG. 7b may comprise more than three sub-phases. It is also possible to remove the final sub-phase and extend the main sub-phase to the end of the arc-stabilizing phase. In embodiments wherein an arc-stabilizing phase is to be terminated before the end of the last start-up phase, the arc-stabilizing phase may be extended to the end of the last start-up phase.

The invention claimed is:

1. A welding apparatus, comprising:
a hot wire feeder for feeding at least one hot wire towards a work piece;
a contactor for transferring current to said hot wire for arc generation;
a cold wire feeder for feeding at least one cold wire towards said work piece; and
a control unit that controls said hot and cold wire feeders during a starting of a submerged arc welding process by the welding apparatus, wherein the starting of the submerged arc welding process includes an arc ignition phase (IP), an arc-stabilizing phase (AP) and a subsequent stable arc phase (SP); wherein said arc-stabilizing phase (AP) comprises at least one initial sub-phase (IS) and at least one subsequent main sub-phase (MS), wherein the control unit controls the hot wire feeder to:
feed the hot wire at a first constant feed speed during the initial sub-phase (IS);
feed the hot wire at a second constant feed speed during the main sub-phase (MS); and
continuously, during the stable arc phase (SP), adjust a fourth feed speed of the hot wire in dependence upon at least a welding current transferred through said hot wire; and
wherein the control unit controls the cold wire feeder to:
feed the cold wire at a third constant feed speed during the main sub-phase (MS); and
continuously, during the stable arc phase (SP), adjust a fifth feed speed of the cold wire in dependence on at least the first constant feed speed, the second constant feed speed, or the fourth feed speed of the hot wire.

2. The welding apparatus according to claim 1, wherein said control unit is configured to maintain a sixth feed speed of the cold wire, in a direction towards said work piece during the initial sub-phase (IS), equal to or lower than 9 cm/min.

3. The welding apparatus according to claim 1, wherein said control unit is configured to maintain the cold wire stationary during the initial sub-phase (IS).

4. The welding apparatus according to claim 1, wherein the first constant feed speed is equal to the second constant feed speed, and wherein said control unit is configured to control said hot wire feeder to maintain the first constant feed speed of the hot wire constant throughout the arc-stabilizing phase (AP).

5. The welding apparatus according to claim 1, wherein said control unit is configured to control said hot wire feeder to provide the hot wire with a first feed speed during a first sub-phase selected from a first list consisting of the initial sub-phase (IS) and the main sub-phase (MS), and a second feed speed during a second sub-phase selected from a second list consisting of the initial sub-phase (IS) and the main sub-phase (MS).

6. The welding apparatus according to claim 1, wherein said control unit is configured to maintain the arc-stabilizing phase (AP) for a predetermined period in a range of 1-6 seconds.

7. The welding apparatus according to claim 1, wherein more than one hot wire is fed towards the work piece.

8. The welding apparatus according to claim 1, wherein more than one cold wire is fed towards the work piece.

9. The welding apparatus according to claim 1, comprising an arc detector for detecting a presence of an arc during the arc ignition phase (IP), and wherein said control unit is configured to initiate the arc-stabilizing phase (AP) immediately upon receiving a signal from said arc detector indicating the presence of the arc.

* * * * *